United States Patent
Beyer et al.

(10) Patent No.: US 10,059,830 B2
(45) Date of Patent: Aug. 28, 2018

(54) PROCESS TO PRODUCE A VINYLIDENE CHLORIDE-BASED HETEROPOLYMER

(71) Applicant: Dow Global Technologies LLC, Midland, MI (US)

(72) Inventors: Douglas E. Beyer, Midland, TX (US); Steven R. Jenkins, Stanford, MI (US)

(*) Notice: Subject to any disclaimer, the term of this patent is extended or adjusted under 35 U.S.C. 154(b) by 29 days.

(21) Appl. No.: 15/034,671

(22) PCT Filed: Oct. 14, 2014

(86) PCT No.: PCT/US2014/060370
§ 371 (c)(1),
(2) Date: May 5, 2016

(87) PCT Pub. No.: WO2015/069418
PCT Pub. Date: May 14, 2015

(65) Prior Publication Data
US 2016/0272785 A1    Sep. 22, 2016

Related U.S. Application Data

(60) Provisional application No. 61/902,389, filed on Nov. 11, 2013.

(51) Int. Cl.
| | | |
|---|---|---|
| C08K 5/45 | (2006.01) | |
| C08L 27/08 | (2006.01) | |
| C08F 214/08 | (2006.01) | |
| C08K 5/378 | (2006.01) | |

(52) U.S. Cl.
CPC .............. *C08K 5/45* (2013.01); *C08F 214/08* (2013.01); *C08L 27/08* (2013.01); *C08K 5/378* (2013.01); *C08L 2203/16* (2013.01)

(58) Field of Classification Search
USPC .................................. 524/84, 560; 525/902
See application file for complete search history.

(56) References Cited

U.S. PATENT DOCUMENTS

| | | | | |
|---|---|---|---|---|
| 2,938,883 A | * | 5/1960 | Raich ................ | C08K 5/134 524/287 |
| 2,968,651 A | * | 1/1961 | Friedrich, Jr. ....... | C08F 14/08 526/200 |
| 3,007,903 A | | 11/1961 | Stark et al. | |
| 3,557,265 A | | 1/1971 | Chisholm et al. | |
| 3,565,985 A | | 2/1971 | Schrenk et al. | |
| 3,879,359 A | | 4/1975 | Hinkamp et al. | |
| 3,884,606 A | | 5/1975 | Schrenk | |
| 6,627,679 B1 | | 9/2003 | Kling | |
| 7,754,300 B2 | * | 7/2010 | Beyer ................... | B29C 55/28 264/454 |

FOREIGN PATENT DOCUMENTS

| | | |
|---|---|---|
| WO | WO97/17399 | 5/1997 |
| WO | WO 2008/008875 | 1/2008 |
| WO | WO 2010/096608 | 8/2010 |
| WO | WO 2013/048738 | 4/2013 |
| WO | WO 2013/048746 | 4/2013 |

OTHER PUBLICATIONS

EP Response to Office Action received Dec. 21, 2016; from counterpart EP Application No. 14790933.7.
EP Office Action dated Jun. 21, 2016; from EP counterpart Application No. 14790933.7.
PCT Search Report dated Feb. 4, 2015; from PCT counterpart Application No. PCT/US2014/60370.
PCT IPRP dated May 17, 2016; from PCT counterpart Application No. PCT/US2014/60370.
Anonymous; "Vinylidene Chloride Polymer Compositions and Irradiated Articles Prepared Therefrom;" Research Disclosure, Hampshire, GB, vol. 418, No. 53, (Feb. 1, 1999).
Kirk-Othmer, "Waxes:", Encyc. Chem. Tech. 3rd Ed., (J. Wiley & Sons 1980), pp. 473-477.

* cited by examiner

*Primary Examiner* — Henry Hu
(74) *Attorney, Agent, or Firm* — Brooks, Cameron & Huebsch, PLLC

(57) ABSTRACT

A process to prepare a vinylidene chloride heteropolymer comprising copolymerizing vinylidene chloride with at least one comonomer selected from the group consisting of alkyl acrylates, non-vinylidene chloride vinyl monomers and combinations thereof in the presence of an indicator, wherein the indicator is soluble in vinylidene chloride, the at least one comonomer, or a mixture of the vinylidene chloride and the at least one comonomer is provided.

7 Claims, No Drawings

PROCESS TO PRODUCE A VINYLIDENE CHLORIDE-BASED HETEROPOLYMER

FIELD OF INVENTION

The instant invention relates to a process to produce a vinylidene chloride-based heteropolymer.

BACKGROUND OF THE INVENTION

Coextruded films having a layer of vinylidene chloride heteropolymers (PVDC) are used as barrier films to prevent passage of gasses, particularly as oxygen and water vapor barrier films in food packaging. Such barrier films may be about 2 mils thick and may further include layers of polyolefins. In such films, the barrier property is imparted by the PVDC layer. In some applications, it is useful to have an indicator uniformly distributed in the PVDC layer. In many plastics, indicators which may be detected by spectroscopy, are added via melt compounding. Such method of adding indicators is not useful for vinylidene chloride-based heteropolymers because the melt mixing step causes undesirable degradation, yellowing and black speck formation within the heteropolymer. Furthermore, the melt mixing step is costly. Indicators may be added to vinylidene chloride based heteropolymers by dry blending. However, when added in this manner, the indicator will not be evenly distributed throughout the heteropolymer and is further prone to segregation. Finally, dry blending step is also costly. Therefore, a cost effective method to uniformly distribute an indicator in PVDC would be desirable.

SUMMARY OF THE INVENTION

The instant invention is a process to produce a vinylidene chloride-based heteropolymer.

In one embodiment, the instant invention provides a process to prepare a vinylidene chloride heteropolymer (PVDC) comprising copolymerizing vinylidene chloride with at least one comonomer selected from the group consisting of alkyl acrylates, non-vinylidene chloride vinyl monomers and combinations thereof in the presence of an indicator, wherein the indicator is soluble in vinylidene chloride, the at least one comonomer, or a mixture of the vinylidene chloride and the at least one comonomer.

DETAILED DESCRIPTION OF THE INVENTION

The instant invention is a process to produce a vinylidene chloride-based heteropolymer. The process to produce a vinylidene chloride-based heteropolymer according to the present invention comprises copolymerizing vinylidene chloride with at least one comonomer selected from the group consisting of alkyl acrylates, non-vinylidene chloride vinyl monomers and combinations thereof in the presence of an indicator, wherein the indicator is soluble in vinylidene chloride, the at least one comonomer, or a mixture of the vinylidene chloride and the at least one comonomer.

The copolymerization is within the skill in the art such as taught by U.S. Pat. Nos. 2,968,651, 3,007,903, 3,879,359, and 6,627,679 except that specific monomers and monomer compositions necessary to achieve the desired polymer compositions are used along with and specific selections of polymerization conditions including; time, temperature, initiators, and other additives. As used herein, copolymerization includes the polymerization process with more than one monomer.

As used herein, the term "indicator" includes colorants, optical brighteners, and any compound which may be spectroscopically detected. Spectroscopically detected as used herein means detectable by absorption and/or emission in the electromagnetic radiation spectrum. In one embodiment, the spectroscopic method is selected from the group consisting of ultraviolet (UV), visible and infrared (IR) spectroscopy.

In one embodiment, the indicator is selected from the group of materials which absorb in the UV, including hydroxy benzophenones (e.g. CYASORB UV-531), benzotriazoles (e.g. TINUVIN P). These could also have the additional function as a UV stabilizer. CYASORB UV-531 is 2-hydroxy-4-octoxyphenyl)-phenylmethanone and is commercially available from Cytec Industries, Inc. (Woodland Park, N.J., USA). TINUVIN P is 2-(2H-benzotriazol-2-yl)-p-cresol and is commercially available from BASF. Because such materials may, in some instances, provide the additional effect of whitening the materials into which they are incorporated, such materials may be referred to as optical brighteners. Optical brighteners may, but need not, emit light in the visible radiation range.

In another embodiment, the indicator is selected from the group consisting of materials that absorb in and are detectible in the visible electromagnetic range. In some instances, such materials may act as masking agents or colorants for yellowness in the polymer. Exemplary colorants include SOLVENT VIOLET 13 and SOLVENT VIOLET 33, In yet another embodiment, the indicator is selected from the group of materials which absorb in and/or are detectable in the IR electromagnetic range. Such materials include polyethers and polyols, such as, glycerol monostearate and polyethylene glycol.

As used herein, the terms "vinylidene chloride-based heteropolymer" and "PVDC" encompass copolymers of vinylidene chloride which have units derived from vinylidene chloride and one other monomer as well as interpolymers of vinylidene chloride which have units derived from vinylidene chloride and more than one other monomer. Interpolymers include, for example, terpolymers (polymers having units derived from vinylidene chloride and two other monomers) and tetrapolymers (polymers having units derived from vinylidene chloride and three other monomers). Vinylidene chloride copolymers are disclosed, for example, in U.S. Pat. No. 7,754,300. Vinylidene chloride terpolymers are disclosed, for example, in PCT Publication Nos. WO2013048746 and WO2013048738.

As used herein, the term "the indicator is soluble in vinylidene chloride, the at least one comonomer, or a mixture of the vinylidene chloride and the at least one comonomer" means that the indicator can be dissolved in vinylidene chloride, the at least one comonomer, or a mixture of the vinylidene chloride and the at least one comonomer over the entire temperature range in which the polymerization occurs without visible precipitation of undissolved indicator. The temperature range of the polymerization process may vary, as is known in the art, depending upon the desired end product and the choice of comonomer(s). Furthermore, the exact solubility limit may vary depending upon the choice of initial solvent for the indicator, i.e. vinylidene chloride, the at least one comonomer, or a mixture of the vinylidene chloride and the at least one comonomer as well as its solubility in the complete polymerization mixture. For example, the polymerization temperature may range from equal to or greater than 0 to 95° C. in a particular embodiment. All individual values and subranges from greater than or equal to 0 to 95 ° C. are included herein and disclosed herein; for example, the polymerization can occur at a temperature from a lower limit of 0, 5, 10, 20, 30, 40, 50 or 60° C. to an upper limit of 5, 10, 20 40, 50, 00, 70, 80, 90, 95° C. For example, the polymerization may occur over a temperature range from greater than 0 to 95° C., or in the alternative, from 0 to 95° C., or in the alternative, from 5 to 70° C., or in the alternative, from 20 to 60° C., or in the alternative, from 10 to 90° C., or in the alternative, from 20 to 60° C., or in the alternative, from 10 to 80° C., or in the alternative, from 15 to 75° C. Exemplary solubility ranges may be from 5 ppm to 5000 ppm. All individual values and subranges from 5 to 5000 ppm are included herein and disclosed herein. For example, the indicator may be soluble at levels from a lower limit of 5, 50, 100, 500, 2500, or 4000 ppm to an upper limit of 10, 90, 175, 1000, 3750, or 5000 ppm.

In an alternative embodiment, the vinylidene chloride, the at least one comonomer selected from the group consisting of alkyl acrylates, non-vinylidene chloride vinyl monomers and combinations thereof and the indicator are mixed together, prior to polymerization, at a temperature from −50 to 95° C. All individual values and subranges are included herein and disclosed herein; for example, these components may be mixed together at a temperature from a lower limit of −50, −40, −30, −20, −10, 0, 10, 20, 30 , 40, 50, 60, 70 or 80° C. to an upper limit of −40, −30, −20, −10, 0, 10, 20, 30 , 40, 50, 60, 70, 80, or 95° C. For example, these components may mixed together at a temperature from −50 to 95° C., or in the alternative, from −20 to 20° C., or in the alternative, from −10 to 60° C.

As used herein, the terms "uniform mass distribution" and "uniformly distributed" refer to a condition in which the indicator is not subject to a variation throughout the PVDC in concentration of more than 25%, wherein such variation is caused by segregation of polymer particles of different sizes.

Alkyl acrylates useful in the invention include, for example, methyl acrylate, ethyl acrylate, butyl acrylate and combinations thereof. In one embodiment, the alkyl acrylates include alkyl acrylates having alkyl groups of from 1 to 5 carbon atoms and combinations thereof. In another embodiment, the alkyl acrylate is methyl or butyl acrylate, or a combination thereof In yet another embodiment, the alkyl acrylate is methyl acrylate.

Non-vinylidene chloride vinyl monomers useful in the invention include all vinyl monomers except for vinylidene chloride. Such monomers include, for example, styrene, vinyl acetate, vinyl chloride, methyl methacrylate, ethyl methacrylate, acrylic acid, methacrylic acid, itaconic acid, acrylonitrile, methacrylonitrile, and N-vinyl pyrrolidone.

In an alternative embodiment, the instant invention provides a process to make a PVDC, a PVDC, and an extruded or coated article comprising the PVDC, except that the PVDC comprises at least 50 wt % units derived from vinylidene chloride. All individual values and subranges from at least 50 wt % are included herein and disclosed herein. For example, the amount of units derived from vinylidene chloride may be from a lower limit of 50 wt %, or in the alternative, from a lower limit of 60 wt %,or in the alternative, from a lower limit of 70 wt %, or in the alternative, from a lower limit of 80 wt %, or in the alternative, from a lower limit of 90 wt %, or in the alternative, from a lower limit of 93 wt %, or in the alternative, from a lower limit of 96 wt %. In one embodiment, the amount of units derived from vinylidene chloride is from 60 to 99 wt %, or in the alternative, from 75 to 98 wt %, or in the alternative, from 89 to 97 wt %, or in the alternative, from 85 to 98 wt %, or in the alternative, from 50 to 70 wt %.

In an alternative embodiment, the instant invention provides a process to make a PVDC, a PVDC, and an extruded or coated article comprising the PVDC, except that the copolymerization occurs at an elevated temperature, i.e. a temperature equal to or greater than 60° C.

In an alternative embodiment, the instant invention provides a process to make a PVDC, a PVDC, and an extruded or coated article comprising the PVDC, except that the indicator is an optical brightener and the optical brightener is 2,2'-(2,5-thiophenylenediyl)bis(5-tert-butylbenzoxazole).

In an alternative embodiment, the instant invention provides a process to make a PVDC, a PVDC, and an extruded or coated article comprising the PVDC, except that the at least one comonomer is methyl acrylate, vinyl chloride, or a combination thereof.

In an alternative embodiment, the instant invention provides a process to make a PVDC, a PVDC, and an extruded or coated article comprising the PVDC, except that the copolymerizing occurs in a suspension polymerization process. In a particular embodiment, the instant invention provides a process to make a PVDC, a PVDC, and an extruded or coated article comprising the PVDC, except that the copolymerizing occurs in a suspension polymerization process and the PVDC has a Mw from 50,000 to 200,000 daltons. In another particular embodiment, the instant invention provides a process to make a PVDC, a PVDC, and an extruded or coated article comprising the PVDC, except that the copolymerizing occurs in a suspension polymerization process and the PVDC has a Mw from 70,000 to 130,000 daltons.

In an alternative embodiment, the instant invention provides a process to make a PVDC, a PVDC, and an extruded or coated article comprising the PVDC, except that the copolymerizing occurs in an emulsion polymerization process.

In an alternative embodiment, the instant invention provides a process to make a PVDC, a PVDC, and an extruded or coated article comprising the PVDC, except that the indicator is uniformly mixed with at least a portion of the at least one comonomer prior to the copolymerizing step.

In one embodiment, the indicator is solubilized in the vinylidene chloride, the at least one comonomer, or a mixture of the vinylidene chloride and the at least one comonomer.

In an alternative embodiment, the instant invention provides a process to make a PVDC, except that, prior to copolymerization, the indicator is uniformly mixed with at least one additive selected from the group consisting of antioxidants, heat stabilizers, light stabilizers, pigments, processing aids, lubricants, acid scavengers, waxes, suspending agents, and fillers and the combined additive/ indicator uniformly mixed with the vinylidene chloride and at least one comonomer.

In an alternative embodiment, the instant invention provides a process to make a PVDC, a PVDC, and an extruded or coated article comprising the PVDC, except that the PVDC has a Mw from 10,000 to 1,000,000 daltons. All individual values and subranges from 10,000 to 1,000,000 daltons are included herein and disclosed herein; for example, the Mw can be from a lower limit of 10,000; 50,000; 100,000; 200,000; 300,000; 400,000; 500,000; 600, 000; 700,000; 800,000 or 900,000 daltons to an upper limit of 25,000; 75,000; 150,000; 250,000; 350,000; 450,000; 550,000; 6500,000; 750,000; 850,000; 950,000 or 1,000,000 daltons. For example, the Mw of the PVDC may be from 10,000 to 1,000,000 daltons, or in the alternative, the Mw of the PVDC may be from 40,000 to 300,000 daltons, or in the alternative, the Mw of the PVDC may be from 50,000 to 200,000 daltons, or in the alternative, the Mw of the PVDC may be from 70,000 to 130,000 daltons, or in the alternative, the Mw of the PVDC may be from 250,000 to 740,000 daltons, or in the alternative, the Mw of the PVDC may be from 400,000 to 800,000 daltons, or in the alternative, the Mw of the PVDC may be from 100,000 to 500,000 daltons.

In an alternative embodiment, the instant invention provides a process to make a PVDC, a PVDC, and an extruded or coated article comprising the PVDC, except that the PVDC further comprises from 0.1 to 15 wt % epoxidized oil. All individual values and subranges from 0.1 to 15 wt % are included herein and disclosed herein; for example, the amount of epoxidized oil can be from a lower limit of 0.1, 1, 3, 5, 7, 9, 11, or 13 wt % to an upper limit of 0.5, 2, 4, 6, 8, 10, 12, or 15 wt %. For example the amount of epoxidized oil can be from 0.1 to 15 wt %, or in the alternative, from 1 to 8 wt %, or in the alternative from 0.5 to 5 wt %, or in the alternative from 0.5 to 2.5 wt %, or in the alternative, from 8 to 11 wt %, or in the alternative, from 3 to 6 wt %.

In an alternative embodiment, the instant invention provides a process to make a PVDC, a PVDC, and an extruded or coated article comprising the PVDC, except that the PVDC further comprises from 0.1 to 15 wt % ester plasticizer. All individual values and subranges from 0.1 to 15 wt % are included herein and disclosed herein; for example, the amount of plasticizer in the PVDC can be from a lower limit of 0.1, 2, 4, 6, 8, 10, 12, or 14 wt % to an upper limit of 0.6, 1, 3, 5, 7, 9, 11, 13, or 15 wt %. For example, the amount of plasticizer in the PVDC can be from 0.1 to 15 wt %, or in the alternative, from 2 to 8 wt %, or in the alternative from 0.3 to 5 wt %.

In an alternative embodiment, the instant invention provides a process to make a PVDC, a PVDC, and an extruded or coated article comprising the PVDC, except that the indicator is present at a level from 5 to 5000 ppm, based on the total weight of the PVDC. All individual values and subranges from 5 to 5000 ppm are included herein and disclosed herein; for example, the amount of indicator can be from a lower limit of 5, 50, 250, 750, 1500, 2500, 3500 or 4500 ppm to an upper limit of 25, 150, 500, 1000, 2000, 3000, 4000 or 5000 ppm. For example, the amount of indicator in the PVDC can be from 5 to 5000 ppm, or in the alternative, the amount of indicator in the PVDC can be from 5 to 2500 ppm, or in the alternative, the amount of indicator in the PVDC can be from 2500 to 5000 ppm, or in the alternative, the amount of indicator in the PVDC can be from 5 to 250 ppm, or in the alternative, the amount of indicator in the PVDC can be from 25 to 750 ppm, or in the alternative, the amount of indicator in the PVDC can be from 20 to 120 ppm.

In another alternative embodiment, the instant invention provides a process to make a PVDC, a PVDC, and an extruded article comprising the PVDC, except that the indicator is an optical brightener and the optical brightener is 2,2'-(2,5-thiophenylenediyl)bis(5-tert-butylbenzoxazole) and is present at a level from 5 to 5000 ppm, based on the total weight of the PVDC. All individual values and subranges from 5 to 5000 ppm are included herein and disclosed herein; for example, the amount of optical brightener can be from a lower limit of 5, 50, 250, 750, 1500, 2500, 3500 or 4500 ppm to an upper limit of 25, 150, 500, 1000, 2000, 3000, 4000 or 5000 ppm. For example, the amount of optical brightener in the PVDC can be from 5 to 5000 ppm, or in the alternative, the amount of optical brightener in the PVDC can be from 5 to 2500 ppm, or in the alternative, the amount of optical brightener in the PVDC can be from 2500 to 5000 ppm, or in the alternative, the amount of optical brightener in the PVDC can be from 5 to 250 ppm, or in the alternative, the amount of optical brightener in the PVDC can be from 25 to 750 ppm, or in the alternative, the amount of optical brightener in the PVDC can be from 20 to 120 ppm.

In an alternative embodiment, the instant invention provides an extruded article comprising the PVDC according to any of the embodiments disclosed herein except that the article is a multi-layer film formed by the coextrusion of the vinylidene chloride-based heteropolymer with at least one other polymer. Any polymer suitable for coextrusion with the PVDC may be used in embodiments of the present invention.

In another embodiment, one or more additive selected from the group consisting of stabilizers, such as heat or thermal stabilizers, antioxidants, and UV stabilizers, acid scavengers, pigments, processing aids, lubricants, fillers, plasticizers, and anti-blocking agents may be added to the composition. Each of these additives is within the skill in the art and several types of each are commercially available. Preferably, the vinylidene chloride polymer composition, in addition to the additives according to the practice of the invention, contains only additives commonly used such as the listed types.

Exemplary lubricants include fatty acids, such as stearic acid; esters, such as fatty esters, wax esters, glycol esters, and fatty alcohol esters; fatty alcohols, such as n-stearyl alcohol; fatty amides, such as N,N'-ethylene bis stearamide; metallic salt of fatty acids, such as calcium stearate, and magnesium stearate; and polyolefin waxes, such as paraffinic, and oxidized polyethylene. Paraffin and polyethylene waxes and their properties and synthesis are described in 24 Kirk-Othmer Encyc. Chem. Tech. 3rd Ed., Waxes, at 473-77 (J. Wiley & Sons 1980), which is incorporated herein by reference.

In an alternative embodiment, the instant invention further provides a vinylidene chloride-based heteropolymer composition produced according to any embodiment of the inventive method disclosed herein, wherein the indicator has a uniform mass distribution in the vinylidene chloride-based heteropolymer.

In an alternative embodiment, the instant invention further provides a vinylidene chloride-based heteropolymer comprising units derived from vinylidene chloride; units derived from at least one comonomer selected from the group consisting of alkyl acrylates, non-vinylidene chloride vinyl monomers and combinations thereof; and an indicator, wherein the indicator has a uniform mass distribution in the vinylidene chloride-based heteropolymer.

In another alternative embodiment, the instant invention further provides an extruded article comprising any embodiment of the vinylidene chloride-based heteropolymer disclosed herein.

In another embodiment, the instant invention further provides coated article comprising a coating and a substrate, wherein the coating comprises any embodiment of the vinylidene chloride-based heteropolymer disclosed herein.

The vinylidene chloride-based heteropolymers can be used to form a variety of extruded (cast, blown, or profiled), molded, injection molded, or calendered articles. Films or sheets made from the compositions of this invention are useful as packaging and wrapping films and may be monolayer or multilayer films. The sheets or films of the present invention can be used alone or laminated to another film or a packaging film component thus forming a package, which contains a product. The sheets or films of the present invention are particularly useful for packaging. Oxygen barrier properties are important in film applications such as packaging primal cuts of meat (that is, large cuts of meat which are shipped to a specific store for further cutting for specific consumer consumption). The multilayer layer, sheet or film comprising the blend or composition of this invention may optionally comprise at most 50, preferably at most 25, more preferably at most 15, most preferably at most 10 wt % of at least one other polymer. In one embodiment where the article is a film, preferably a multilayer film, the film advantageously has a thickness from 0.1 to less than 10 mils. All individual values and subranges from 0.1 to less than 10 mils are included herein and disclosed herein. For example, the film may have a thickness from 0.1 to less than 10 mils, or in the alternative, from 0.1 to 5 mils, or in the alternative, from 5 to less than 10 mils, or in the alternative, from 2.5 to 7.5 mils. In another embodiment, the article is a sheet having a thickness from 10 to 200 mils. All individual values and subranges from 10 to 200 mils are included herein and disclosed herein. For example, the sheet thickness can be from 10 to 200 mils, or in the alternative, from 10 to 100 miles, or in the alternative, from 100 to 200 mils, or in the alternative from 75 to 150 mils.

In an alternative embodiment, the films or sheets may be further processed such as by thermoforming, lamination or sealing to form, for example, pouches and trays.

The composition is advantageously used for film by at least one film forming method within the skill in the art. The film forming method may produce monolayer films, or preferably multilayer films. Any suitable film forming process may be used, including those well known in the art, and disclosed for example, in U.S. Pat. Nos. 3,565,985; 3,557,265; 3,884,606, and PCT Publication Nos. WO2008008875 and WO2010096608.

The vinylidene chloride-based heteropolymers can be used to form a variety of coated articles comprising a substrate and a coating which comprises the vinylidene chloride-based heteropolymer. In an alternative embodiment, the coating is a solvent or emulsion coating which is placed onto the substrate. In yet another embodiment, a primer layer or corona treatment is utilized to promote adhesion of the coating onto the substrate. Exemplary coatings include solvent solution coating on cellophane or polyethylene terephthalate, as the substrate, for food packaging coated articles. Another exemplary coating is a latex (emulsion polymerized) coating on polypropylene as the substrate for food packaging food articles.

In another embodiment, the invention provides a process to prepare a vinylidene chloride heteropolymer consisting essentially of: copolymerizing vinylidene chloride with at least one comonomer selected from the group consisting of alkyl acrylates, non-vinylidene chloride vinyl monomers and combinations thereof in the presence of an indicator, wherein the indicator is soluble in vinylidene chloride, the at least one comonomer, or a mixture of the vinylidene chloride and the at least one comonomer

EXAMPLES

The following examples illustrate the present invention but are not intended to limit the scope of the invention.

Comparative Example 1

PVDC without Indicator

A vinylidene chloride/methyl acrylate copolymer having a melting point of 147° C., a molecular weight of 86,000 Mw and containing 2% epoxidized soybean oil was produced via suspension polymerization in a 300 ml citrate bottle reactor using conventional suspension polymerization techniques. The resultant polymer was isolated and dried to give a 91% yield of product. The PVDC product had a dull or off white appearance. The CIE whiteness index was 73.2. The product did not fluoresce under 366 nm ultraviolet light.

A 5 ml thick plaque was compression molded at 311° F. (155° C.). The resultant plaque was uniform in appearance, clear and had a slight yellow color. The CIE b value measured against a white tile was 2.2. Under 366 nm ultraviolet light the plaque did not fluoresce Inventive Example 1

PVDC having Uniform Mass Distribution of an Indicator which is an Optical Brightener In a similar manner as Comparative Example 1, a vinylidene chloride/methyl acrylate copolymer having a melting point of 147° C., a molecular weight of 86,000 Mw and containing 2% epoxidized soybean oil was produced via suspension polymerization in a 300 ml citrate bottle reactor using conventional suspension polymerization techniques. Except in this example 100 ppm 2,2'-(2,5-thiophenylenediyl)bis(5-tert-butylbenzoxazole) was dissolved in the vinylidene chloride/methyl acrylate monomer mixture prior to the polymerization. The resultant polymer was isolated and dried to give a 91% yield of product. The PVDC product had a bright white appearance. The CIE whiteness index was 106.3. The product fluoresced under 366 nm ultraviolet light.

A 5 ml thick specimen of the PVDC product was prepared by compression molding at 311° F. (155 ° C.). The resultant plaque was uniform in appearance, clear and colorless to slightly bluish. The CIE b value measured against a white tile was −0.4. Under 366 nm ultraviolet light the plaque gave a uniform fluorescence.

Comparative Example B and Inventive Examples 2 and 3

A series of vinylidene chloride/methyl acrylate copolymers having a melting point of 152° C. were produced via suspension polymerization in a 300 ml citrate bottle reactor using conventional suspension polymerization techniques. Prior to polymerization Solvent Violet 13 (SV-13, CAS 81-48-1, hydroxy-4-(p-tolylamino)anthracene-9,10-dione) dye was dissolved in epoxidized linseed oil at the concentrations shown in Table 1. 1.2 weight % of these mixtures were then added to a vinylidene chloride/methyl acrylate monomer mixture. The resultant polymer was isolated and dried to give the yield and molecular weight noted in Table 1. The resulting violet color of Examples 2 and 3 was uniform throughout the resin beads and showed no signs of color variation with segregation.

TABLE 1

| Example | Concentration of SV-13 | | Polymerization results | | |
|---|---|---|---|---|---|
| | Concentration in ELO, pph | Concentration in monomer, ppm | Product yield, % | Molecular Weight, Mw | Visual appearance |
| Comparative Example B | 0 | 0 | 93 | 86,000 | off white |
| Example 2 | 0.083 | 10 | 93 | 81,000 | light violet |
| Example 3 | 0.42 | 50 | 92 | 85,000 | medium violet |

Comparative Example C and Inventive Examples 4, 5, and 6

A series of vinylidene chloride/methyl acrylate copolymers having a melting point of 152° C. were produced via suspension polymerization in a 300 ml citrate bottle reactor using conventional suspension polymerization techniques. Prior to polymerization Solvent violet 33 (SV-33, CAS 86090-40-6, anthraquinone dyestuf) dye was dissolved in epoxidized soybean oil at the concentrations shown in Table 2. 1.2 weight % of these mixtures were then added to a vinylidene chloride/methyl acrylate monomer mixture. The resultant polymer was isolated and dried to give the yield and molecular weight noted in Table 2. The resulting violet color in Examples 4, 5 and 6 was uniform throughout the resin beads and showed no signs of color variation with segregation.

TABLE 2

| Example | Concentration of SV-33 | | Polymerization results | | |
|---|---|---|---|---|---|
| | Concentration in ESO, pph | Concentration in monomer, ppm | Product yield, % | Molecular Weight, Mw | Visual appearance |
| Comparative Example C | 0 | 0 | 92 | 104,000 | off white |
| Example 4 | 0.022 | 10 | 91 | 105,000 | light violet |
| Example 5 | 0.11 | 50 | 91 | 106,000 | medium violet |
| Example 6 | 1.1 | 500 | 83 | 106,000 | dark violet |

Comparative Example D 2000 grams of a vinylidene chloride/methyl acrylate copolymer having a melting point of 152° C., a molecular weight of 91,000 Mw and containing 1.2% MYVACET 9-40 (Distilled Acetylated Monoglycerides, available from Eastman Chemical Products, Inc. CAS# 68990-54-5) was added to a laboratory scale Prodex high intensity mixer. 1.0 grams of Solvent Violet 33 anthraquinone dyestuff, available from Mitsubishi Chemical Corporation as DIARESIN BLUE J, was also added to the mixer. The mixture was then mixed for three minutes at 1800 rpm, periodically stopping manually mix in any material adhered to the mixer walls by static. The resulting product is a color concentrate of 500 ppm Solvent Violet 33 substantially uniformly coated on the exterior surfaces of the PVDC copolymer beads. However, since the dye in on the surface of the beads only, segregation of the resin into a fraction with more small particles will cause a local increase in surface area, increase the concentration of the SV-33 indicator resulting in a variation in indicator concentration.

Comparative Example E 2666.5 grams of a vinylidene chloride/methyl acrylate copolymer having a melting point of 170° C., a molecular weight of 87,000 Mw and containing 1.5 Epoxidized soybean oil and 5.1% acetyl tributyl citrate was added to a laboratory scale Prodex high intensity mixer. 0.68 grams of ultramarine blue was also added to the mixer. The mixture was then mixed for one minute at 1800 rpm, periodically stopping manually to mix in any material adhered to the mixer walls. An additional 54.4 grams of epoxidized soybean oil is added to the mixer with mixing and mixed for one minute periodically stopping to mix in any material adhered to the mixer walls. The resulting mixture contained 250 ppm ultramarine blue and was blue in color. However there were significant color variations in the mixture that got significantly worse upon segregation.

TEST METHODS

Test methods include the following:
"Molecular weight" is the weight average molecular weight (Mw) in Daltons. It is measured by size exclusion chromatography using polystyrene calibration. Sample preparation includes dissolving a polyvinylidene chloride resin sample in tetrahydrofuran (THF) at 50° C. The polymers are then analyzed for determination of molecular weight by gel permeation chromatography (GPC) using the Polymer Laboratories Software on a Hewlett Packard 1 100 chromatograph equipped with two columns in series. These columns contain 5μ styrene/divinylbenzene copolymer beads commercially available from Polymer Laboratories under the trade designation PLGel 5μ MIXED-C. The solvent is nitrogen purged HPLC Grade THF. The flow rate is 1.0 milliliter/minute and the injection size is 50 microliters. The molecular weight determination is deduced by using ten narrow molecular weight distribution polystyrene standards (commercially available from Polymer Labs under the trade designation Narrow PS set (about 3,000,000 to 2000 Mp)) in conjunction with their elution volumes.

Color (CIE L, a, b and whiteness) were measured using a Macbeth Color-Eye Spectrophotometer. Because the yellow color is of greatest interest the b value that represents the blue-yellow scale was reported (of the L, a, and b values). Lower or negative is less yellow and more blue. With whiteness measurement, the value was reported with the higher number indicating the whiter specimen.

The melting point of the resin is measured by differential scanning calorimetry (DSC). In this test a sample of resin is weighed into the DSC pan and then melted at 185° C., quenched and annealed at 80° C. Melting point is determined by scanning from ambient to 100° C. at 20° C./min.

The present invention may be embodied in other forms without departing from the spirit and the essential attributes thereof, and, accordingly, reference should be made to the appended claims, rather than to the foregoing specification, as indicating the scope of the invention.

We claim:

1. A process to prepare a vinylidene chloride copolymer, wherein the process comprises:
   copolymerizing vinylidene chloride with at least one comonomer selected from the group consisting of an alkyl acrylate, a non-vinylidene chloride vinyl monomer and combinations thereof in the presence of an indicator, wherein the indicator is soluble in vinylidene chloride, the at least one comonomer, or a mixture of the vinylidene chloride and the at least one comonomer, and wherein the indicator is 2,2'-(2,5-thiophenylenediyl)bis(5-tert-butylbenzoxazole).

2. The process according to claim 1, wherein the at least one comonomer is methyl acrylate or vinyl chloride.

3. The process according to claim 1, wherein the copolymerizing occurs in a suspension polymerization process.

4. The process according to claim 1, wherein the copolymerizing occurs in an emulsion polymerization process.

5. The process according to claim 1, further comprising adding at least one additive selected from the group consisting of a plasticizer and an epoxidized oil.

6. The process according to claim 5, wherein prior to polymerization, the indicator used for addition is prepared by uniformly mixing it with at least a portion of at least one from the group selected from vinylidene chloride, the at least one comonomer, and the at least one additive.

7. The process according to claim 1, further comprising adding a suspending agent to the vinylidene chloride and at least one comonomer prior to the copolymerizing step.

* * * * *